United States Patent [19]

Longrod

[11] 4,436,192

[45] Mar. 13, 1984

[54] RIBBON DRIVE CLUTCH

[75] Inventor: Scott J. Longrod, Woodbury, Conn.

[73] Assignee: SCM Corporation, New York, N.Y.

[21] Appl. No.: 311,224

[22] Filed: Oct. 14, 1981

[51] Int. Cl.$^{3}$ .......................... F16D 11/06; B41J 33/50

[52] U.S. Cl. .................................. 192/43.1; 192/48.91; 192/48.92; 400/214; 400/225; 400/697.1

[58] Field of Search .................... 192/43.1, 48.9, 48.91, 192/48.92, 28, 25; 400/214, 225, 696, 697.1

[56] References Cited

U.S. PATENT DOCUMENTS

| | | | |
|---|---|---|---|
| 2,150,227 | 3/1939 | Lake et al. | 192/28 |
| 2,972,402 | 2/1961 | Howard | 400/225 X |
| 3,367,471 | 2/1968 | Berill | 400/225 X |
| 3,384,211 | 5/1968 | Placke et al. | 192/28 |
| 4,247,210 | 1/1981 | Kacmarcik et al. | 400/697.1 X |
| 4,329,072 | 5/1982 | Kacmarcik | 400/225 X |
| 4,347,007 | 8/1982 | Schaefer | 400/697.1 X |

FOREIGN PATENT DOCUMENTS

| | | | |
|---|---|---|---|
| 708691 | 7/1941 | Fed. Rep. of Germany | 192/43.1 |
| 1436757 | 9/1973 | Fed. Rep. of Germany | 400/214 |

OTHER PUBLICATIONS

Schaefer, "Two-Color Cartridge Ribbon System with Correction", vol. 22, No. 6, 11/79, IBM.

*Primary Examiner*—Rodney H. Bonck
*Assistant Examiner*—David D. House
*Attorney, Agent, or Firm*—Kenneth W. Greb; Ernest F. Weinberger

[57] ABSTRACT

A ribbon drive clutch comprises a stepper motor which has an output shaft on which there is mounted a clutch plate and a pair of cams. A plurality of pawls are each pivotally mounted on the clutch plate and are disposed to engage the first cam for rotation with the output shaft responsive to rotation of the output shaft in a first direction and disposed to engage the second cam for rotation with the output shaft responsive to rotation of the output shaft in a second direction. A first cam follower is disposed for operation of a ribbon drive linkage to drive a first ribbon responsive to rotation of the first cam and a second cam follower is disposed for operation of a ribbon drive linkage to drive a second ribbon responsive to rotation of the second cam.

11 Claims, 5 Drawing Figures

RIBBON DRIVE CLUTCH

BACKGROUND OF THE INVENTION

The present invention relates to a ribbon drive clutch for use in typewriter equipment to alternately drive a printing ribbon and an error correction ribbon.

The development of high speed typewriter equipment and the development of error correction ribbons for use in such typewriter equipment has resulted in a need for a simple, effective ribbon drive apparatus which is capable of driving either a printing ribbon or an error correction ribbon.

The prior art related to ribbon drive apparatus includes the devices shown in U.S. Pat. No. 3,026,987 to Gather, U.S. Pat. No. 3,948,382 to Nesbitt et al., and U.S. Pat. No. 3,954,167 to Kranz et a1. The deficiencies of these devices is related to their use of gear trains which are shifted by a reversing stepper motor to drive a gear train in an opposite direction. The use of gear trains in the above devices results in inaccuracy of operation due to wear of the gear teeth and possible damage due to dirt or other foreign matter falling into the gear train, especially when such devices are operated at relatively high speeds. In addition, the use of gear trains results in a need for a relatively high degree of accuracy in the manufacture of the gears, the gear plates, and the bearings on which the gears are mounted. This results in a generally complex and costly assembly.

OBJECTS OF THE INVENTION

It is an object of the present invention to overcome the deficiencies of the prior art by providing a ribbon drive clutch which is capable of alternatively driving a printing ribbon and an error correction ribbon.

Another object of the present invention is to provide a ribbon drive clutch for driving a printing ribbon and an error correction ribbon which does not utilize gears of any kind.

Another object of the present invention is to provide a ribbon drive clutch which has a relatively simple mode of operation and which is capable of reliable long term operation.

Still another object of the present invention is to provide a ribbon drive clutch which comprises a relatively small number of simple parts which are capable of being manufactured in volume at a relatively low unit cost.

SUMMARY OF THE INVENTION

In accordance with the present invention there is provided a ribbon drive clutch which comprises a reversible stepper motor on the shaft of which there is mounted a clutch plate and an upper cam and a lower cam. The upper cam is mounted above the clutch plate and moves a cam follower which is disposed to operate a first ribbon drive mechanism for feeding a first ribbon which may be a printing ribbon. The lower cam is mounted below the clutch plate and moves a cam follower which is disposed to operate a second ribbon drive mechanism for feeding a second ribbon which may be an error correction ribbon. The clutch plate has three pivotally mounted pawls which engage the first cam during counterclockwise shaft rotation and which engage the second cam during clockwise shaft rotation.

The ribbon drive clutch also includes a spring loaded key, operated by an actuator arm, which is driven by a solenoid actuated arm to connect the shaft and the clutch plate, responsive to energization of the solenoid.

A spring loaded arm is provided which operates to hold the actuator arm, causing the key to connect the shaft and the clutch plate during rotation of the clutch plate. The spring loaded arm enables the solenoid to become deenergized shortly after the plate has started rotating without uncoupling the plate from the shaft.

BRIEF DESCRIPTION OF THE DRAWINGS

Additional objects and advantages of the invention will become apparent during the course of the following specification when taken in connection with the accompanying drawings in which.

DETAILED DESCRIPTION OF THE INVENTION

Figure 1:
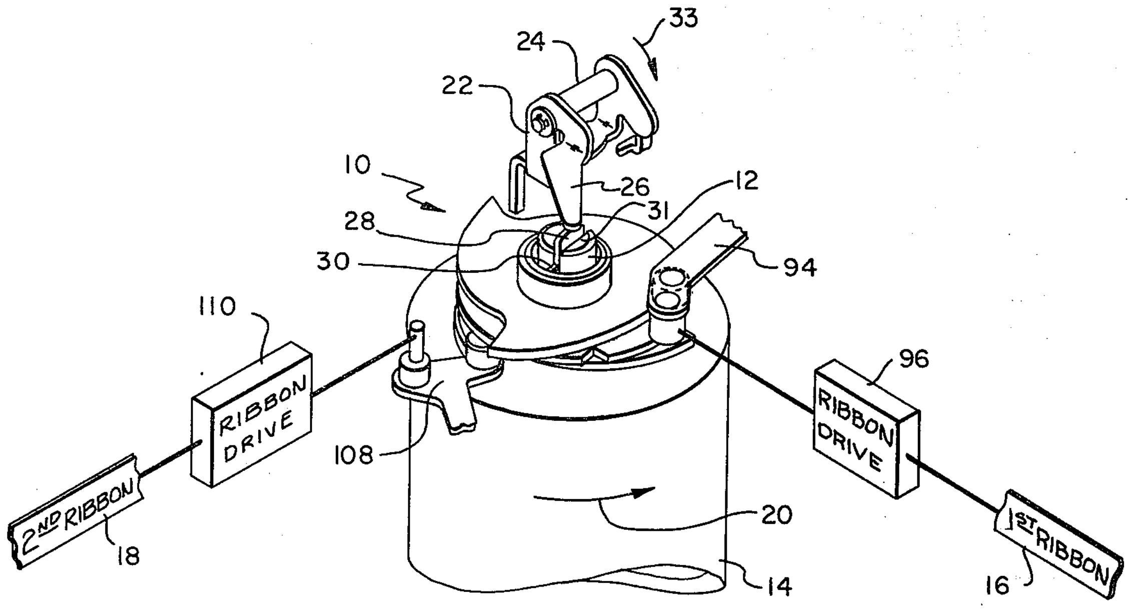
FIG. 1 is an overall perspective view of a ribbon drive clutch made in accordance with the present invention.

With reference to the drawings there is shown in FIG. 1 a ribbon drive clutch 10 made in accordance with the present invention. As is shown in FIG. 1, the ribbon drive clutch 10 is mounted on the shaft 12 of a stepper motor 14. The ribbon drive clutch 10 operates to drive a first ribbon 16 and a second ribbon 18 on a typewriter, or similar apparatus, which is not shown. The ribbon drive clutch 10 operates to drive the first ribbon 16 when the stepper motor 14 is energized to rotate in a first direction and operates to drive the second ribbon 18 when the stepper motor 14 is energized to rotate in an opposite direction. The first ribbon 16 is generally a printing ribbon and is charged with any one of a number of known printing media and the second ribbon is generally an error correction ribbon and is charged with any one of a number of known error correction media.

To drive the first ribbon 16, the stepper motor 14 is energized to rotate the shaft 12 in a counterclockwise direction, when viewed from above as indicated by the arrow 20 in FIG. 1. An actuator 22 is provided pivotally mounted on a shaft 24. The actuator 22 includes a depending arm 26 which bears on a coupling key 28 which is seated in a slot 30 formed in the end 31 of the shaft 12. A solenoid, which is not shown, is energized to pivot the actuator 22 member in a clockwise direction as indicated by the arrow 33 in FIG. 1, responsive to depressing a keyboard key which is also not shown. When the actuator 22 pivots in the direction shown by the arrow 33 in FIG. 1, the arm 26 drives the coupling key 28 downward along the longitudinal axis of the shaft 12. The key 28 is always seated in the slot 30 and is therefore rotated by the shaft 12.

The ribbon drive clutch 10 includes a clutch plate 32 which is supported on the shaft 12 and which can either remain stationary during shaft 12 rotation or rotate with the shaft 12 in a manner which will be presently described. The clutch plate 32 includes an integrally formed hub 34 which projects upward from the clutch plate 32. The hub 34 includes a series of abutments 36 and adjacent recesses 38 which are integrally formed around the inside wall 40 of the hub 34 and which are best shown in FIG. 3.

Figure 3:
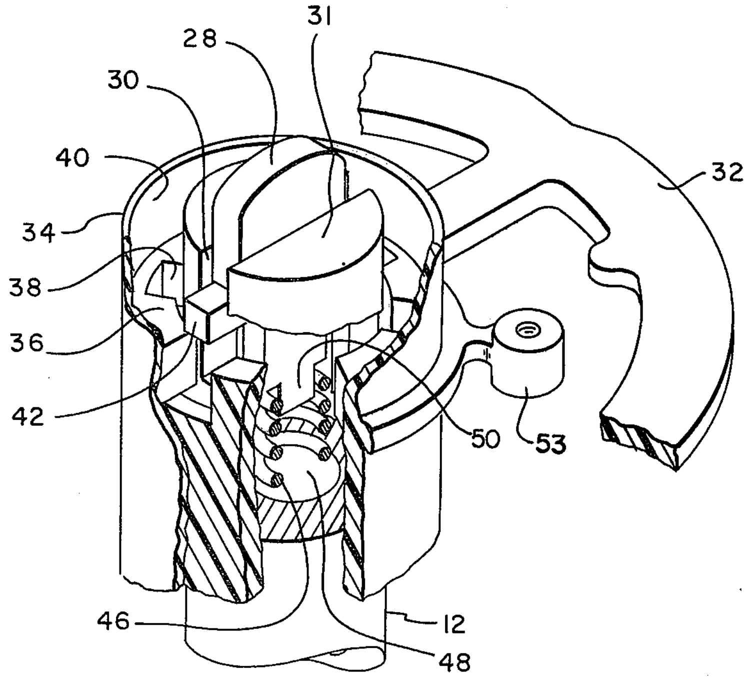
FIG. 3 is a fragmentary perspective view of the ribbon drive clutch of FIG. 1 with portions shown broken away to reveal details of internal construction.
Figure 2:
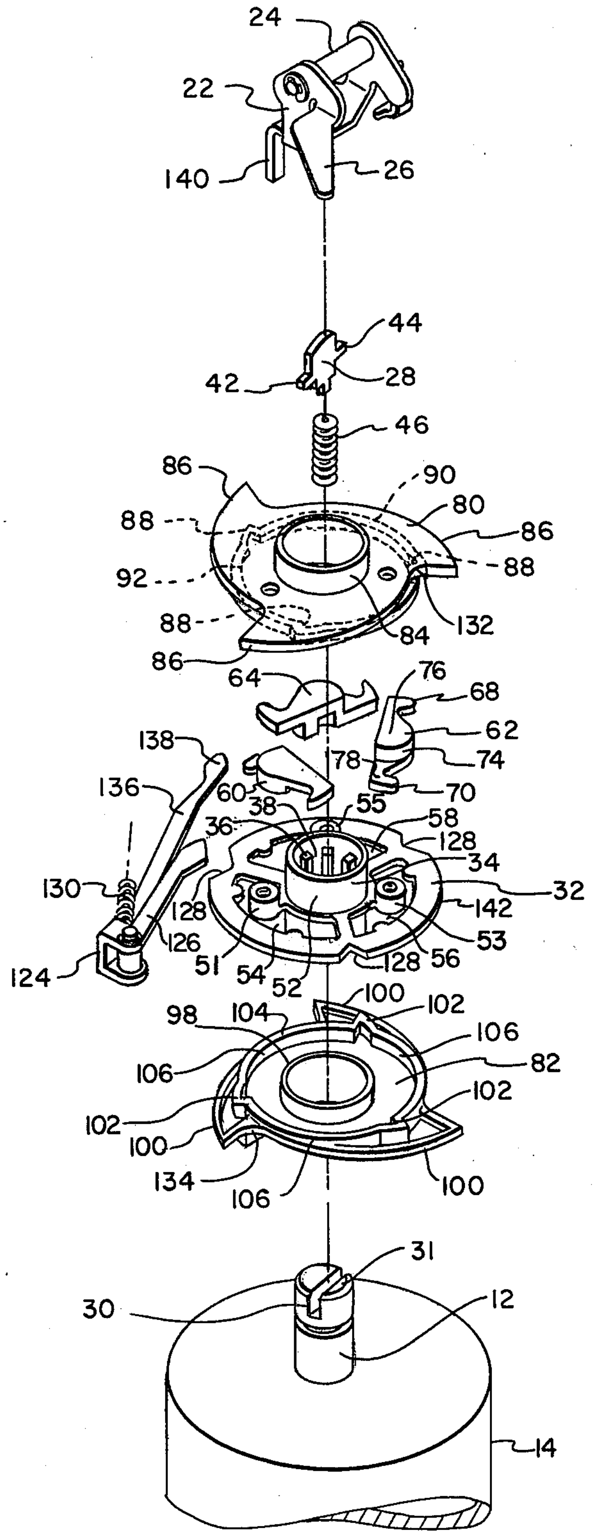
FIG. 2 is an exploded view of the ribbon drive clutch of FIG. 1.

As is shown in FIGS. 2 and 3, the coupling key 28 includes a pair of oppositely directed abutments 42, 44. The abutments 42, 44 on the coupling key 28 enter corresponding recesses 38 responsive to downward movement of the coupling key 28. The abutments 42, 44 on the coupling key 28 engage the abutments 36 on the hub 34, thereby coupling the clutch plate 32 to the shaft 12. The downward movement of the coupling key 28 is resisted by a helical compression spring 46 mounted below the coupling key 28 in a recess 48 formed in the shaft 12. The helical compression spring 46 engages a projecting portion 50 on the coupling key 28.

Figure 4:
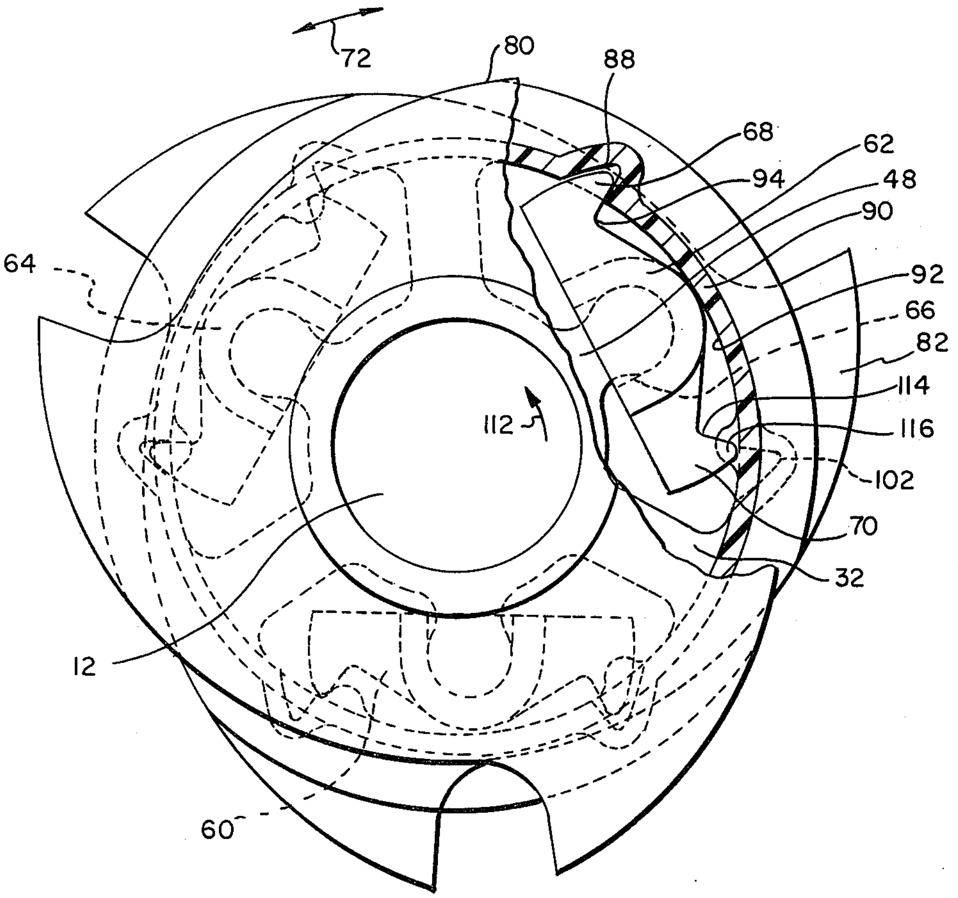
FIG. 4 is a top view of the cam and clutch plate assembly of the ribbon drive clutch of FIG. 1, showing a first operating position, with portions shown broken away to reveal details of internal construction.
Figure 5:
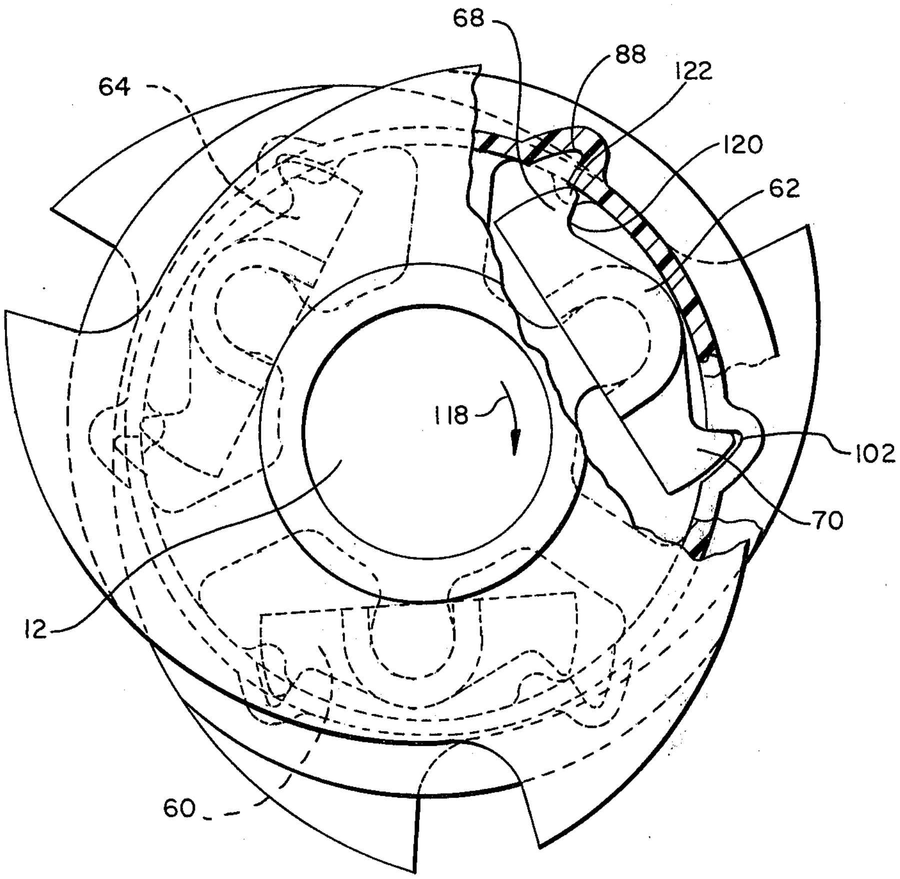
FIG. 5 is a top view of the ribbon drive clutch similar to FIG. 4 showing a second operating position.

As is best shown in FIGS. 2, 4 and 5, the hub 34 further includes three identical integrally formed cylindrical abutments 51, 53, 55 which project in a radially outward direction from the surface 52 of the hub 34. The cylindrical abutments 51, 53, 55 are spaced at 120° intervals and project into recesses 54, 56, 58 formed in the clutch plate 32. Three pawls 60, 62, 64 are mounted, one each, on the three cylindrical abutments51, 53, 55. The three pawls 60, 62, 64 are identical, and therefore only pawl 62 will be described in detail. The pawl 62 includes a U shaped recess 66 which is seated on the cylindrical abutment 53, a first tooth 68 and a second tooth 70. The recess 66 and the cylindrical abutment 53 are proportioned to enable the pawl 62 to pivot about the abutment 53 in the direction shown by the arrow 72 in FIG. 4.

The pawl 62 includes a step portion 74 which is best shown in FIG. 2 and the first tooth 68 is disposed on the upper portion 76 of the step 74 while the second tooth 70 is disposed on the lower portion 78 of the step 74. The formation of the first tooth 68 and second tooth 70 on the upper 76 and lower 78 step portions, respectively, enables the teeth 68, 70 to separately engage first 80 and second 82 cams in a manner which will be presently described.

The first cam 80 has a central hub 84 which is rotatably supported on the hub 34 above the clutch plate 32. The cam 80 has a series of three curved cam surfaces 86 spaced at 120° intervals and a series of three interior tooth shaped notches 88 formed by an integral rim 90. The portions 92 of the rim 90, between the notches 88, form control surfaces. A first cam follower 94, shown in FIG. 1, is biased by conventional spring means which are not shown, to seat in a notch 132 formed between the high and the low portions of the cam surfaces 86. The first cam follower 94, when seated in the notch 132, holds the first cam 80 in a rest position. The first cam follower 94 is driven by the first cam 80 to operate a drive linkage, which is indicated symbolically by the block 96 in FIG. 1 to drive the first ribbon 16.

The second cam 82 has a central hub 98 which is rotatably supported on the hub 34 below the clutch plate 32. Like the first cam 80, the second cam 82 has a series of three curved cam surfaces 100, spaced at 120° intervals, and a series of three interior tooth shaped notches 102, formed by an integral rim 104. The portions 106 of the rim 104 between the notches 102 form control surfaces. A second cam follower 108, shown in FIG. 1, is biased by conventional spring means, which are not shown, to seat in a notch 134 formed between the high and the low portions of the cam surfaces 100. The second cam follower 108 is driven by the second cam 82 to operate a drive linkage, which is indicated symbolically by the block 110 in FIG. 1 to drive the second ribbon 18.

During operation of the ribbon drive clutch 10, counterclockwise rotation of the shaft 12, in the direction shown by the arrow 112 in FIG. 4, rotates the clutch plate 32 in a counterclockwise direction. The hub 34 of the clutch plate 32 drives the pawls 60, 62, 64 in a counterclockwise direction about the axis of the shaft 12. If the tooth 70 were seated in the notch 102 in the cam 82 at the time that the shaft 12 started to rotate counterclockwise, then the counterclockwise movement of the pawl 62 would cause the tooth 70 to cam out from the notch 102 due to the camming angle of the inside surface 114 on the tooth 70 and due to the cam 82 being held by the cam follower 108. This camming action pivots the pawl 62 clockwise about the cylindrical abutment 53 which drives the first tooth 68 into the notch 88 in the cam 80 as is shown in FIG. 4. The end 116 of the tooth 70 is now positioned against one of the portions 106 of the cam 82, thereby holding the tooth 68 in the notch 88. Continuous counterclockwise rotation of the shaft 12 and the clutch plate 32 by the stepper motor 14 will cause the pawl 62 to rotate the cam 80 counterclockwise 120°. The cam follower 94 is driven outward by the cam surface 86 thereby actuating the ribbon drive linkage 96 for feeding the first ribbon 16 one feed increment.

If the tooth 68 were already seated in the notch 88 in the cam 80 at the time that the shaft 12 started to rotate counterclockwise, the control surface of the cam 82 would hold the tooth 68 in the notch 88 and the counterclockwise movement of the pawl 62 will rotate the cam 80 in a counterclockwise direction as described above.

To drive the second ribbon 18, the stepper motor 14 is energized to rotate the shaft 12 clockwise and a solenoid, which is not shown, is energized for driving the coupling key 28 downward, thereby coupling the clutch plate 32 to the shaft 12 in the manner which has been previously described. The clutch plate 32 now drives the pawl 62 in a clockwise direction as shown by the arrow 118 in FIG. 5. If the tooth 68 were seated in the notch 88 in the cam 80 at the time that the shaft 12 started to rotate clockwise, the clockwise movement of the pawl 62 would cause the tooth 68 to cam out of the notch 88 due to the camming angle of the inside surface 120 on the tooth 68 and due to the cam 80 being held by the cam follower 94. The tooth 70 then enters the notch 102 in the cam 82 and is held there by the end 122 of the tooth 68 being positioned against one of the portions 92 of the cam 80. Continuous rotation of the shaft 12 and the clutch plate 32 will cause the tooth 70 of the pawl 62 to rotate the cam 82 clockwise 120°, controlled by the stepper motor 14. The cam follower 108 is driven outward by the cam surface 100 which actuates the ribbon drive linkage 110, thereby feeding the second ribbon 18 one feed increment.

If the tooth 70 were already seated in the notch 102 in the cam 82 at the time the shaft 12 started to rotate clockwise, one of the portions 92 of the cam 80 would hold the tooth 70 in the notch 102 and the clockwise movement of the pawl 62 will again rotate the cam 80 clockwise for feeding the second ribbon 18, as described above.

The purpose of having three identical pawls 60, 62, 64 is to minimize wear of the driving teeth on the pawls in order to provide a dual direction ribbon feeding mechanism having a desirable long life. This is accomplished by having the three pawls 60, 62, 64 in engagement with the three notches 88 or 102 simultaneously thereby equalizing the rotational driving force about the axis of the shaft 12.

A detent mechanism 124 is provided which has an arm 126 biased to seat in a notch 128 in the periphery of the clutch plate 32 by a spring 130. The arm 126 seats in one of three notches 128 at the same time the cam follower 94 seats in the notch 132 in the cam 80 and the cam follower 108 seats in the notch 134 in the cam 82. The notches 128 are arranged at 120° intervals. The detent mechanism 124 has a second arm 136 with its end 138 located adjacent a finger 140 formed on the actuator 22. When the stepper motor 14 has rotated the plate 32 in either direction, the arm 126 will cam out from the notch 128 and ride against the peripheral surface 142 of the plate 32. The arm 126 moves the end 138 of the arm 136 against the finger 140 of the actuator 22 for holding the actuator 22 in its actuated position for maintaining the plate 32 coupled to the shaft 12 during the 120° travel of the plate 32. With this arrangement, the solenoid (not shown) may become deenergized shortly after the plate 32 has started rotating without uncoupling the plate 32 from the shaft 12. After the plate 32 has completed a 120° rotation interval, the arm 126 will seat in the notch 128, the end 138 of the arm 136 will move away from the finger 140, the solenoid will be deenergized, and the spring 46 will bias the coupling key 28 upward to disengage the plate 32 from the shaft 12.

It can now be seen that the pawl 62 is controlled by the cam 82 for positively driving the cam 80 in one direction and that the pawl 62 is controlled by the cam 80 for positively driving the cam 82 in an opposite direction.

While a preferred embodiment of the invention has been shown and described herein, it is obvious that numerous additions, changes and omissions may be made in such embodiments without departing from the spirit and scope of the invention.

What is claimed is:

1. A ribbon drive clutch comprising a reversible stepper motor having an output shaft, clutch plate means mounted on said output shaft, first cam means mounted on said clutch plate means, second cam means mounted on said clutch plate means, pawl means mounted on said clutch plate means disposed to engage said first cam means for rotation with said output shaft responsive to rotation of said output shaft in a first direction and disposed to engage said second cam means for rotation with said output shaft responsive to rotation of said output shaft in a second direction, first ribbon drive means, second ribbon drive means, first cam follower means disposed to operate said first ribbon drive means responsive to rotation of said output shaft in said first direction and, second cam follower means disposed to operate said second ribbon drive means responsive to rotation of said second ribbon drive means in said second direction.

2. A ribbon drive clutch according to claim 1 further comprising key means, capable of an engaged position and a disengaged position with said key means capable of coupling said clutch plate means to said output shaft when in said engaged position.

3. A ribbon drive clutch according to claim 2 further comprising solenoid operated actuator means disposed to move said key into said engaged position responsive to energization of said solenoid.

4. A ribbon drive clutch according to claim 2 further comprising spring means mounted on said output shaft and disposed to bias said key toward said disengaged position.

5. A ribbon drive clutch according to claim 1 in which said pawl means comprises a single pawl pivotally mounted on said clutch plate means.

6. A ribbon drive clutch according to claim 1 in which said pawl means comprises a plurality of pawls each pivotally mounted on said clutch plate means and disposed equally spaced about said output shaft.

7. A ribbon drive clutch according to claim 6 in which each of said pawls has a first and a second tooth portion and in which said first cam means has a cam surface having a recessed portion disposed to accept said first tooth portion and said second cam means has a cam surface having a recessed portion disposed to accept said second tooth portion with said cam surface proportioned such that counterclockwise rotation of said clutch plate causes said second tooth portion to disengage said second cam means and causes said first tooth portion to engage said first cam means for rotation of said first cam means with said clutch plate and clockwise rotation of said clutch plate causes said first tooth portion to disengage said first cam means and causes said second tooth portion to engage said second cam means for rotation of said second cam means with said clutch plate.

8. A ribbon drive clutch according to claim 7 in which said first cam means is mounted above said clutch plate means and said second cam means is mounted below said clutch plate means.

9. A ribbon drive clutch according to claim 1 in which said first and second cam means are mounted on opposite sides of said clutch plate means.

10. A ribbon drive clutch according to claim 8 in which each of said pawls has a step portion with said first tooth portion formed on an upper portion of said step portion and said second tooth portion formed on a lower portion of said step portion.

11. A ribbon drive clutch according to claim 3 further comprising detent arm means disposed to removably engage said solenoid operated actuator means and retain said solenoid operated actuator means in position moving said key into said engaged position even when said solenoid is deenergized.

* * * * *